United States Patent
Hayhurst et al.

[15] 3,649,303
[45] Mar. 14, 1972

[54] TAMALE MANUFACTURE

[72] Inventors: Lewis J. Hayhurst, Glenview; William L. Avery, Oak Forest; Clarence B. Gels, Chicago, all of Ill.

[73] Assignee: Swift & Company, Chicago, Ill.

[22] Filed: Dec. 23, 1968

[21] Appl. No.: 786,363

[52] U.S. Cl. .............................99/182, 99/83, 99/90 NS, 99/92, 99/214, 99/215
[51] Int. Cl. .........................................A23b 1/00, A23l 3/10
[58] Field of Search ..............99/92, 83, 90 NS, 1, 182, 109, 99/166, 214, 215

[56] References Cited

UNITED STATES PATENTS

| 620,084 | 2/1899 | Bunzl | 99/90 |
| 2,433,622 | 12/1947 | Novak | 99/1 X |
| 1,265,853 | 5/1918 | Wiseman | 99/109 UX |

*Primary Examiner*—Raymond N. Jones
*Assistant Examiner*—James R. Hoffman
*Attorney*—Edward T. McCabe, Charles E. Bouton and W. C. Davis

[57] ABSTRACT

Concentric layered food products, such as tamales, are produced by enwrapping the product with a protective edible collagen material, and then subjecting the enwrapped product to a cooking process whereby the edible collagen material is consumed.

5 Claims, No Drawings

TAMALE MANUFACTURE

This invention relates to the food art, and more particularly relates to an improved concentric layered product, such as tamales, and the process for making same. Concentric layered products have an inner core of food material with encircling layers of food materials of different consistencies.

The present invention provides the use of an edible protective wrapper during the initial preparatory steps in manufacturing a concentric layered product. An example of such a product is a tamale, which comprises an inner core of a mixture of meat, cereals, and spices and a corn meal encircling layer. However, other food materials may be benefited by the novel method of the present invention, and it is intended that the phrase "concentric layered" also include other food materials such as cheese, candies, vegetables, fruits or the like that may be used as an inner core encircled by a layer of edible meal, pastry, cereal stock or other similar food substances.

Food products of this type are extremely fragile during manufacturing, cooking, packaging and serving. It has been necessary to wrap the concentric layered product in a permanent protective wrapper to retain shape and consistency through handling by the ultimate consumer. In the present methods of manufacture, tamales, for example, are wrapped with parchment paper sheets that will withstand the physical abuses of processing and retain the shape and integrity required until removed by the consumer.

Such protective materials normally used bring about certain disadvantages. The finished tamale food product is enwrapped by a protective material that is inedible and must be removed prior to consumption. The removal of the protective wrapper is time consuming and somewhat of an unsanitary and messy requirement in that it involves handling by the consumer. Also, there may be some loss of the edible food product due to its adherence to the protective wrapper. During and subsequent to the removal, the tamale often remains quite fragile and is thus subject to breakage due to necessary handling. The result is a food product that is difficult to serve without wasting some of the product and damaging its appearance through breakage. Also, the messy, inedible protective wrapper is waste material which must be disposed of after it has been removed.

Accordingly, it is an object of the present invention to produce an improved concentric layered food product comprising an inner core of food material within an encircling layer of food material of different consistency, having a resistance to breakage and eliminating an inedible protective wrapper that would otherwise require removal by a consumer.

Another object of the present invention is to produce an improved tamale product comprising an inner core of a mixture of meat, cereals, and spices, and encircled with a layer of corn meal which will not require removal of a protective wrapper prior to consumption.

It is a further object of this invention to provide a novel process to produce concentric layered food products, wherein such products are protected during initial stages of manufacture by a protective wrapper of a material that is consumed by disintegration or dissolution during the subsequent stages of the manufacturing process.

The product of the present invention is an improved concentric layered food comprising an inner core of food material within an encircling layer of food material of another consistency, which is initially wrapped in a sheet of edible protective material that is consumed during the manufacturing procedure and appears to be at least partially absorbed onto the outer encircling layer of food material. More specifically, one type of improved concentric layered food product according to the present invention is an improved tamale food product.

It has been found that an edible collagen material in sheeted form can be used as the protective wrapper and will accomplish our objectives. By the use of the edible collagen material as a wrapper in place of the normally used parchment paper wrapper in tamale manufacturing, a superior concentric layered food product is produced. Tamales produced in this manner have an improved appearance and are more convenient to the consumer in that there is no requirement of wrapper removal prior to consumption, thereby eliminating handling by the consumer and disposal of the inedible wrapper as waste. The improved tamales have a glossy surface, a more desirable mouth-feel and an increased firmness as compared to tamales wrapped in parchment paper or similar materials.

The process of the present invention involves forming an inner core of food material, encircling said core with a layer of food material of different consistency and enwrapping the product with a consumable and edible protective material to retain shape and consistency of the food materials during initial handling and processing. The enwrapped food product is then packed in containers such as cans or glass jars and given a sterilizing cook by a retort process whereupon the protective material is consumed, and then the product is cooled to room temperature.

In carrying out a preferred embodiment of the invention to manufacture tamales, a mixture of meat, cereals and spices is formed into a longitudinal core and encircled by a layer of corn meal in accordance with practices well known in the art to form longitudinal-shaped items of 3 to 6 inches in length and one-half to 2 inches in diameter. Thereafter, each item is wrapped in a protective sheet of edible collagen material. The tamales are packed in containers, which may be cans or glass jars in a number of 4 to 64 to a container, and sealed. The containerized product is sterilized by a retort cooking process at 230° to 245° F., 5 to 18 p.s.i. pressure for 60 to 285 minutes. After the sterilizing-cooking process is complete, the containers are allowed to cool to room temperature. At this point, examination of the product reveals that the protective wrapper has disappeared. It is our belief that the retort conditions, which will sterilize and cook the food material to a self-sustaining consistency also cause the collagen wrapper to dissolve or disintegrate or otherwise be consumed and to be partially absorbed on the outer surface of the product.

In order to serve the food item, a consumer may either heat the product in the container or open it and empty the product into a saucepan and heat to a serving temperature of about 110°–120° F. There is no protective wrapper to remove, yet the product will retain its form during removal and normal handling by the consumer.

A type of collagen material wrapper found suitable for use in the present invention is regular collagen sausage casing material produced by the Brechteen Corp. and sold under the name "Brechteen". It is believed that the method used to produce this material entails the use of an acid-swollen collagen which is extruded in the form of a tube, by the use of a special spinning head to impart fiber orientation for strength, into an ammonium sulfate solution, which is then coagulated, tanned, plasticized and dried. This specific description is not meant to limit itself to only one type of collagen material. Other edible collagen materials, including that produced by the method disclosed in U.S. Pat. No. 3,346,402, may be used.

EXAMPLE

A mixture of minced meat, cereals and spices were blended together and formed into longitudinal cores. A layer of corn meal was encircled around each core forming longitudinal-shaped items of 4½ inches in length and 1 inch in diameter. Each item was wrapped in a sheet of collagen material obtained by longitudinally slitting and transversely cutting a large-diameter sausage casing produced by the Brechteen Corp. and sold under the name "Brechteen". The items were packed in a can, sealed and placed into a retort cooker. The items were retorted for 85 minutes at 240° F. and 12 p.s.i. pressure and then allowed to cool to room temperature. The can was later opened and the tamales were removed and placed in a saucepan, heated to about 110° F. and served.

Each tamale had retained its original shape and did not break apart when removed from the can or heated to the serving temperature. The collagen wrapper had dissolved or dissipated, leaving no visible remainder except for an appealing glossy surface upon the tamale. Accordingly, there was no detectable difference in the taste of the tamales processed in this example and ones normally processed by the use of a parchment paper wrapper.

It is surprising that the aforedescribed collagen material is completely consumed or dissipated in the course of processing tamales; because where routinely employed in sausage manufacture it remains as an integral part of the product even after normal heat processing. It is believed that the retorting operation results in dissolving the collagen which is then, at least partially, absorbed onto the corn meal layer of the tamale.

Obviously many modifications and variations of the invention as hereinbefore set forth may be made without departing from the spirit and scope thereof, and, therefore, only such limitations should be imposed as are indicated in the appended claims.

We claim:

1. An improved process for manufacturing a concentric layered food product comprising: forming a core of food material, said food material comprising meat, cereals and spices; encircling said core with a layer of food material of different consistency, said encircling layer comprising an edible meal; enwrapping the item with a sheet of edible protective material, said protective material retaining the shape consistency of the food product and being consumable at subsequent retorting conditions; packing and sealing a plurality of said enwrapped items in a container; and retorting the enwrapped food product under such conditions that will sterilize and cook the food materials to a self-sustaining consistency, whereby said edible protective sheet material is consumed.

2. The process of claim 1, wherein the said concentric layered food product is a tamale, the inner core comprises minced meat, cereals and spices and the encircling layer is corn meal.

3. The process of claim 1, wherein the said sheet of protective material comprises an edible collagen material.

4. The process of claim 3, wherein the said retorting process is carried out at 230° to 245° F., 5 to 18 p.s.i. pressure, for 60 to 285 minutes.

5. The process of claim 1 wherein said edible protective material is partially absorbed on the outer surface of said food product during said retorting.

* * * * *